(12) United States Patent
Pihl et al.

(10) Patent No.: US 10,531,001 B2
(45) Date of Patent: Jan. 7, 2020

(54) CONTROLLER, VIDEO CAMERA, AND METHOD FOR CONTROLLING A VIDEO CAMERA

(71) Applicant: Axis AB, Lund (SE)

(72) Inventors: Fredrik Pihl, Lund (SE); Xing Danielsson Fan, Lund (SE); Björn Benderius, Lund (SE); Viktor Edpalm, Lund (SE); Niclas Svensson, Lund (SE); Henrik Eliasson, Lund (SE)

(73) Assignee: Axis AB, Lund (SE)

( * ) Notice: Subject to any disclaimer, the term of this patent is extended or adjusted under 35 U.S.C. 154(b) by 1 day.

(21) Appl. No.: 15/928,722

(22) Filed: Mar. 22, 2018

(65) Prior Publication Data
US 2018/0278849 A1    Sep. 27, 2018

(30) Foreign Application Priority Data

Mar. 24, 2017   (EP) ..................... 17162802

(51) Int. Cl.
*H04N 5/232* (2006.01)
*H04N 19/139* (2014.01)
(Continued)

(52) U.S. Cl.
CPC ..... *H04N 5/23267* (2013.01); *H04N 5/23229* (2013.01); *H04N 5/23232* (2013.01);
(Continued)

(58) Field of Classification Search
CPC ........... H04N 5/23267; H04N 5/23229; H04N 5/243; H04N 19/154; H04N 5/23232;
(Continued)

(56) References Cited

U.S. PATENT DOCUMENTS 5,550,595 A *  8/1996  Hannah ................. H04N 5/235
                                                  348/222.1
2003/0091232 A1  5/2003  Kalevo et al.
(Continued)

FOREIGN PATENT DOCUMENTS

CN        1558680 A       12/2004
CN      102164278 B        5/2013
(Continued)

OTHER PUBLICATIONS

Extended European Search Report dated May 17, 2017 for the European Application No. 17162802.7.
(Continued)

*Primary Examiner* — Jason A Flohre
(74) *Attorney, Agent, or Firm* — Volpe and Koenig, P.C.

(57) ABSTRACT

A method for controlling a video camera which is configured to capture and process image frames prior to encoding. The method comprises determining whether the video camera is going to encode an image frame as an intra-frame or an inter-frame. If the image frame is going to be encoded as an inter-frame, the video camera is controlled to capture and process the image frame using first settings prior to encoding. If the image frame is going to be encoded as an intra-frame, the video camera is controlled to capture and process the image frame using second settings prior to encoding, wherein the second settings are modified in relation to the first settings to further reduce a level of noise in the image frame.

14 Claims, 2 Drawing Sheets

(51) Int. Cl.
*H04N 19/105* (2014.01)
*H04N 19/177* (2014.01)
*H04N 19/154* (2014.01)
*H04N 5/243* (2006.01)

(52) U.S. Cl.
CPC ......... *H04N 5/23254* (2013.01); *H04N 5/243* (2013.01); *H04N 19/105* (2014.11); *H04N 19/139* (2014.11); *H04N 19/154* (2014.11); *H04N 19/177* (2014.11)

(58) Field of Classification Search
CPC ............. H04N 19/177; H04N 5/23254; H04N 19/139; H04N 19/105
See application file for complete search history.

(56) References Cited

U.S. PATENT DOCUMENTS

| | | |
|---|---|---|
| 2003/0161407 A1 | 8/2003 | Murdock et al. |
| 2007/0064815 A1 | 3/2007 | Alvarez et al. |
| 2007/0183512 A1 | 8/2007 | Li et al. |
| 2009/0110078 A1 | 4/2009 | Crinon |
| 2009/0244319 A1* | 10/2009 | Kim .................. H04N 5/23248 348/229.1 |
| 2010/0177246 A1 | 7/2010 | Yong et al. |
| 2011/0249133 A1* | 10/2011 | Zhou ..................... H04N 5/232 348/222.1 |
| 2011/0293014 A1 | 12/2011 | Nakagami et al. |
| 2013/0002898 A1* | 1/2013 | Tian ....................... H04N 5/225 348/222.1 |
| 2013/0027581 A1 | 1/2013 | Price et al. |
| 2013/0106984 A1* | 5/2013 | Wu ......................... H04N 7/15 348/14.08 |
| 2014/0177717 A1 | 6/2014 | Li et al. |
| 2016/0112707 A1* | 4/2016 | Diefenbaugh ......... H04N 19/34 375/240.08 |
| 2016/0125618 A1 | 5/2016 | Johansson et al. |
| 2018/0152606 A1* | 5/2018 | Edpalm .................. H04N 5/232 |
| 2018/0220129 A1 | 8/2018 | Peng et al. |
| 2018/0262754 A1 | 9/2018 | Komi et al. |

FOREIGN PATENT DOCUMENTS

| | | |
|---|---|---|
| JP | 2014-036357 A | 2/2014 |
| JP | 2015-023498 A | 2/2015 |
| WO | 2008/054978 A1 | 5/2008 |
| WO | 2008/075261 A1 | 6/2008 |

OTHER PUBLICATIONS

Extended European Search Report dated Oct. 2, 2017 for the European Application No. 17162801.9.
Stankiewicz et al., "Temporal noise reduction for preprocessing of video streams in monitoring systems," (2000).

* cited by examiner

CONTROLLER, VIDEO CAMERA, AND METHOD FOR CONTROLLING A VIDEO CAMERA

FIELD OF INVENTION

The present teachings relate to the field of video cameras. In particular, it relates to control of a video camera which is configured to capture and process image frames prior to encoding.

BACKGROUND

Conventional video cameras capture image frames and process the captured image frames prior to encoding. The encoded image frames are typically provided in the form of a bit stream which may be sent over a network to a decoder. In such video encoding/decoding systems, it is often desirable to keep the bitrate as low as possible in order to minimize the load on the network and the storage space required to store the encoded video. However, at the same time it is of course desirable to maintain a high video quality with as few artefacts as possible.

Known video coding techniques, such as MPEG-4 and H.264, use inter-frame prediction to reduce video data between a series of frames. This involves techniques such as block-based motion compensation, where a new frame can be predicted block by block by looking for a matching block in a reference frame.

With inter-frame prediction, each frame is classified as a certain type of frame, such as an intra-frame (sometimes referred to as an I-frame, e.g., in H.264) or an inter-frame (sometimes referred to as a P-frame or B-frame, e.g., in H.264). An intra-frame is a self-contained frame that can be independently decoded without reference to any other frames. This is in contrast to an inter-frame which make reference to one or more previously decoded frames.

The intra-frames and the inter-frames are arranged in a certain order in the video stream as defined by a group of pictures (GOP) structure. An intra-frame indicates the beginning of a GOP structure, and thereafter several inter-frames follow. When a decoder encounters a new GOP structure in the bit stream, it does not need any previously decoded frames in order to decode the following frames. When decoding a GOP structure, the decoder will first decode the intra-frame at the beginning of the GOP structure since the intra-frame can be decoded without reference to any other frame. Then the decoder proceeds to decode the next frame in the decoding order, which will be an inter-frame, using the decoded intra-frame as a reference frame. The decoder then proceeds to successively decode inter-frames using one or more of the decoded intra-frame and the previously decoded inter-frames of the GOP structure as reference frames until a new intra-frame indicating the beginning of a new GOP structure is encountered in the bit stream. The intra-frame at the beginning of a GOP structure thus serves as a base reference image for decoding the following inter-frames, since the following inter-frames directly, or indirectly via another reference frame, use the decoded intra-frame as a reference frame.

When encoding an inter-frame, blocks of pixels in the inter-frame are compared to blocks of a reference frames so as to estimate motion vectors, i.e., vectors which describe the motion of the blocks in relation to the reference frames. This comparison typically includes comparing individual pixel values of a block of the inter-frame to individual pixel values of a number of blocks in the reference frame, and selecting the block in the reference frame that gives the best match. As a result of the comparison of individual pixel values, the level of noise in the image frames highly affects the accuracy of the motion vector estimation. In the end, this will have a negative impact on the quality of the encoded video—there will be more artefacts in the video—as well as the bitrate of the encoded video.

However, the solution to this problem is not as simple as just reducing the noise in the image frames, since noise reduction comes at the penalty of introducing blur, both in the temporal domain and the spatial domain, which in turn has a negative impact on the resulting video quality. There is thus a delicate trade-off between improving video quality by improving the motion vector estimates and reducing the video quality by introduction of blur.

SUMMARY

In view of the above, it is thus an object of the present disclosure to find a good trade-off between improving video quality by improving the motion vector estimates, and reducing the video quality by introduction of blur.

According to a first aspect, the above object is achieved by a method for controlling a video camera which is configured to capture and process image frames prior to encoding, comprising: determining whether the video camera is going to encode an image frame as an intra-frame or an inter-frame, if the image frame is going to be encoded as an inter-frame, controlling the video camera to capture and process the image frame using first settings prior to encoding, and if the image frame is going to be encoded as an intra-frame, controlling the video camera to capture and process the image frame using second settings prior to encoding, wherein the second settings are modified in relation to the first settings to further reduce a level of noise in the image frame.

By intra-frame is meant a frame which is coded independently of all other frames. In particular, an intra-frame can be independently decoded without reference to any other frames. An intra-frame is sometimes referred to as an I-frame, e.g., in 11.264.

By inter-frame is meant a frame which is coded with reference to one or more previously decoded frames. An inter-frame is sometimes referred to as a P-frame or a B-frame, e.g., in 11.264.

The first and the second settings generally comprise settings which affect the level of noise in the image frame. These settings may, e.g., be related to exposure time, gain, sharpness, and noise reduction such as spatial and/or temporal noise filtering.

The video camera may generally reduce the level of noise in the image frames. When an image frame is captured and processed using the first settings, the level of noise in the image frame is reduced to a first level. If the image frame instead had been captured and processed using the second settings, the level of noise in the image frame would have been reduced to a second level, which is lower than the first level. By further reducing the level of noise is thus meant that the level of noise in the image frame is reduced to a lower level if the second settings are used compared to if the first settings had been used.

In conventional video cameras, every image frame is treated equally when it comes to capturing and processing with the purpose of producing the best possible image at all times. However, this does not necessarily mean that it will produce the best possible encoded video. Several steps of the capturing and the processing, such as exposure handling and temporal and spatial noise filtering, heavily impact how easy an image frame is to encode, and its ability to be used as a reference for the coming frames.

According to the proposed method, the image frames are handled differently prior to encoding depending on whether they will be encoded as intra-frames or inter-frames. In more detail, the settings which are applied by the video camera when capturing and/or processing the image frames prior to encoding are selected differently depending on whether the image frame will be encoded as an intra-frame or an inter-frame. In particular, the settings are selected such that image frames to be encoded as intra-frames are captured and processed to further reduce the level of noise in the image frame compared to image frames which are to be encoded as inter-frames.

By handling the intra-frames differently from inter-frames when it comes to reduction of the level of noise, it has been found that a good trade-off between improved video quality by improved motion vector estimates, and reduced video quality by introduction of blur may be achieved.

On one hand, an intra-frame serves as a base reference frame for the following inter-frames in the GOP structure. Accordingly, the processing of the intra-frame will affect the encoding quality and bitrate of all frames in the GOP structure. In particular, by further reducing the level of noise in the intra-frame, the intra-frame will serve as an improved reference frame for the purpose of motion vector estimation. Since the motion vector estimation is based on computation of differences between individual pixel values of an inter-frame and a reference frame (stemming from the intra-frame), a reduced level of noise in the reference frame will give rise to a lower variance of the motion vector estimation, thereby improving the accuracy of the motion vector estimation and the resulting quality of the encoded video.

On the other hand, it has been realized that by only performing additional noise reduction in intra-frames, the negative impacts of introducing blur may be mitigated. More specifically, the additional noise reduction may cause blur at portions of the intra-frame where there are moving objects. However, the portions with moving objects will be re-encoded already in the next inter-frame, in which there is less blur due to the higher level of noise. The blur at portions with moving objects will hence only be visible in the encoded intra-frame, but not in the following inter-frames. This is in contrast to a situation where additional noise reduction is applied to all frames, and blur will be introduced and be visible in all frames.

In conclusion, the additional reduction of noise level in the intra-frame, but not the following inter-frames, will have a positive impact in terms of more accurate motion vector estimates for the whole GOP structure, whereas it will have a negative impact in terms of introduction of blur for the intra-frame only.

It is further noted that stationary portions of the image frames will only be encoded in the intra-frame, and these stationary portions will not be encoded for the inter-frames (in inter-frames only the moving objects of the frames are encoded). Thus, in relation to stationary portions of the image frames, there is no loss by not performing additional noise reduction for inter-frames.

There are different ways of modifying the settings in order to allow further reduction of the level of noise. For example, the second settings may be modified in relation to the first settings by increasing a ratio between exposure time and gain of the image frame. A longer exposure time serves to integrate the incoming light over time, thereby leading to a reduced level of noise. A reduced gain will also lead to a reduced level of noise, since the noise will be less amplified. Thus, typically, the signal-to-noise ratio is improved if the gain is reduced and the exposure time increased.

In some cases, the dynamic range of an image frame may be increased by capturing several images in a rapid sequence, using a different exposure level and/or gain for each image, and combining the images into a composite. This is sometimes referred to as high dynamic range imaging, or wide dynamic range. In such cases, i.e., wherein the image frame is composed of a plurality of images captured with different exposure times and/or having different gains, the second settings may be modified in relation to the first settings by increasing a ratio between exposure time and gain for at least one of the plurality of images.

Further, the second settings may be modified in relation to the first settings by modifying the different exposure times in relation to each other. Changing exposure time will change the available dynamic range. For example, a longer exposure time will saturate more pixels in the bright areas. According to examples, the different exposure times could be modified such that a longer exposure time is used in dark portions of the image frame if the image frame is going to be encoded as an inter-frame compared to if the image frame is going to be encoded as an intra-frame, thereby allowing for more moving objects to be captured in the dark parts of the image and get more bright stationary parts covered in the I-frame. The opposite case is also possible.

According to examples, the second settings may be modified in relation to the first settings to decrease sharpness of the image frame. Decreasing sharpening will have a smoothing effect. Also, a decreased sharpening is likely to reduce bitrate without affecting visual quality after compression.

According to examples, the second settings may be modified in relation to the first settings by increasing a strength of at least one of a temporal noise filtering and a spatial noise filtering of the image frame.

The filters may be associated with parameters, or settings, which govern how much a pixel of the image frame is smoothed or averaged with respect to neighboring pixels in time and/or space. The parameters, or settings, also govern how many neighboring pixels in time and/or space that are used by the filter. By strength of a filtering is meant the degree of smoothing achieved by the filtering, or, expressed differently, how much noise that the filter removes.

According to examples, the second settings may be modified in relation to the first settings by increasing a complexity level of at least one of a filtering and a processing algorithm applied to the image frame. In other words, more advanced filtering and processing may be carried out for intra-frames compared to inter-frames. Generally, an intra-frame is faster to encode than an inter-frame, since no search for motion vectors need to be made. That additional time may instead be spent on more complex filtering and processing.

By complexity level it is generally meant how advanced, and/or demanding in terms of time and resources (e.g., memory resources or processing resources), the filtering and/or processing algorithm is. The complexity level may be increased by choosing a different type of algorithm which is more advanced and more time demanding. Alternatively, the complexity level may be increased by choosing the same type of algorithm, but changing parameters of the algorithm to make it more advanced and time demanding. For example, the size of a filter used for spatial or temporal noise filtering may be increased.

The determination whether an image frame is going to be encoded as an intra-frame or an inter-frame may be based on feedback from the encoder. In particular, the step of determining whether the video camera is going to encode an image frame as an intra-frame of an inter-frame may be based on information received from an encoder of the video camera. In this way, feedback from the encoder is used in the control of the video camera upstream of the encoder, such as the capturing and processing of video frames. The information may for example comprise a group of pictures structure.

The group of pictures structure may be static, meaning that it is the same all the time regardless of the contents of the image frames, or dynamic, meaning that it may vary with time depending on the contents in previous image frames, such as the degree of motion in the image frames. The step of determining whether the video camera is going to encode an image frame as an intra-frame or an inter-frame may thus be based on contents in previous image frames. In such embodiments, the GOP structure may be tailored to optimally follow the contents of the image frames. The contents of the previous image frames may for example be analyzed by an image processor upstream of the encoder. In other words, the decision of whether the video camera is going to encode an image frame as an intra-frame or an inter-frame may be based on information received from an image processor upstream of the encoder, rather than information received from the encoder itself.

When the encoded image frames are sent from the video camera over a network, the receiving side typically acknowledges receipt of the image frames. If no acknowledgement is received, thus indicating that an image frame has been lost, the network interface of the video camera may request that the next image frame is encoded as an intra-frame. The step of determining whether the video camera is going to encode an image frame as an intra-frame or an inter-frame may thus be made in response to a network interface of the video camera requesting that the image frame is encoded as an intra-frame. Since the decoding of the image frames, with the exception of intra-frames, depends on previously decoded image frames, a lost frame has the effect that the following frames cannot be decoded until a new intra-frame arrives. Thus, by requesting a new intra-frame, the receiving side will be able to re-start the decoding of the image frames immediately.

According to a second aspect, the above object is achieved by a controller for controlling a video camera which is configured to capture and process image frames prior to encoding, comprising: a processor configured to: determine whether the video camera is going to encode an image frame as an intra-frame or an inter-frame; control the video camera to capture and process the image frame using first settings prior to encoding if the image frame is going to be encoded as an inter-frame; and control the video camera to capture and process the image frame using second settings prior to encoding if the image frame is going to be encoded as an intra-frame, wherein the second settings are modified in relation to the first settings to further reduce a level of noise in the image frame.

According to a third aspect, the above object is achieved by a video camera comprising: an image sensor for capturing image frames; an image processor for processing captured image frames; an encoder arranged downstream of the image sensor and the image processor for encoding captured and processed image frames; and a controller according to the second aspect for controlling the video camera, wherein the controller is configured to control the image sensor to capture image frames and the image processor to process the captured image frames prior to encoding by the encoder.

According to a fourth aspect, the above object is achieved by a non-transitory computer-readable medium having computer-code instructions stored thereon which, when executed by a device having processing capability, are adapted to perform the method according to the first aspect.

The second, third, and fourth aspects may generally have the same features and advantages as the first aspect. It is further noted that the teachings relate to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The systems and devices disclosed herein will be described during operation.

Figure 1:
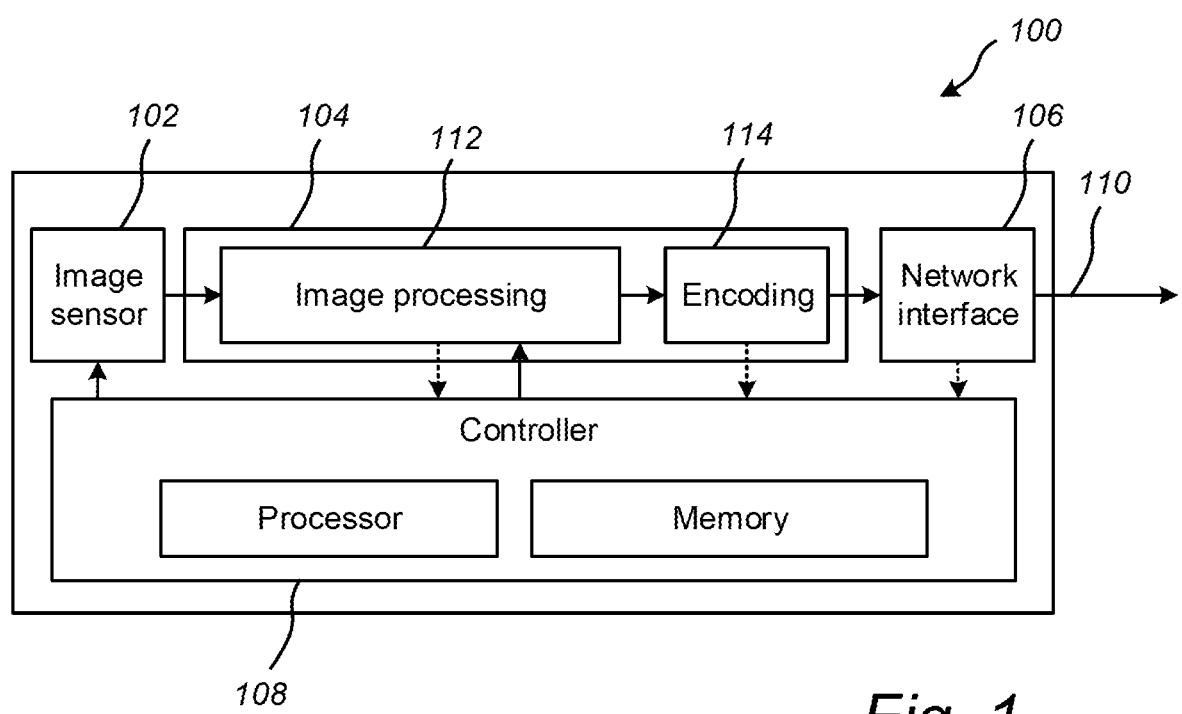
FIG. 1 schematically illustrates a video camera according to embodiments.

FIG. 1 illustrates a video camera 100. The video camera 100 comprises an image sensor 102, an image pipeline 104, a network interface 106, and a controller 108.

Generally, the image sensor 102 captures a sequence of image frames, i.e., a video, of a scene. The image sensor 102 sequentially outputs image frames as raw data to the image pipeline 104, which then processes the image frames. The network interface 106 then transmits the captured and processed image frames over a network in the form of a bit stream 110. Upon receipt of the bit stream 110, a client device (not shown) may decode the bit stream 110 to generate a video of the scene for display to a user.

The image sensor 102 is configured to capture image frames using an exposure time and a gain. The exposure time and the gain affect the level of noise in the image frames. A longer exposure time will result in an image having a lower level of noise compared to a shorter exposure time. However, a longer exposure time will also serve to increase the amount of motion blur in the image frame. Similarly, a lower gain results in an image having a lower level of noise compared to a higher gain. Accordingly, if the ratio between exposure time and gain is increased, the level of noise in the image frame is decreased.

The exposure time and the gain may typically be set automatically by the video camera, e.g., by means of an auto-exposure algorithm. However, the exposure time and gain may also be modified and/or set by the controller 108.

As known in the art, an image pipeline 104 comprises a set of components for performing processing of raw data received from the image sensor 102. In particular, the image pipeline may comprise an image processor 112 for performing image signal processing, and an encoder 114 for encoding the processed image frames. The image signal processing may, for instance, include image sensor corrections, image rotation, image scaling, gamma correction, color-space conversion, chroma subsampling, and framerate conversion. In particular, the image signal processing may include processing which affects the level of noise in the image frames. For example, the image processor 112 may be configured to apply different types of filters to an image frame so as to reduce the level of noise in the image frame. This may include temporal noise filters and/or spatial noise filters. According to other examples, the image processor 112 may be configured to process the image frames to affect the sharpness of the image frame.

The image pipeline 104 further comprises an encoder 114 upstream of the image processor 112. The encoder 114 is configured to compress the sequence of processed image frames. For that purpose, the encoder 114 may generally implement any video coding technique, such as MPEG-4, H.264 or H.265, which uses inter-frame prediction, including block-based motion compensation, as previously described. In particular, the encoder 114 is configured to encode the image frames as intra-frames or inter-frames. For example, the encoder 114 may work with a GOP structure which specifies the order in which the intra- and inter-frames are arranged. The GOP structure may either be static, i.e., fixed, or it may be dynamic, i.e., it may vary temporally. Either way, the encoder 114 is typically aware of whether a frame is to be encoded as an intra-frame or an inter-frame one or more frames in advance.

The image pipeline 114, and particularly the components thereof including the image processor 112 and the encoder 114, may be implemented in software, hardware or a combination thereof. For example, the image pipeline, and the components thereof, may be implemented by computer code instructions stored on a (non-transitory) computer readable medium and which are executed by a processor or a digital signal processor. The image pipeline 114, and the components thereof, may also be implemented by circuitry, such as an integrated circuit, for example in the form of a field-programmable gate array or an application specific integrated circuit.

The network interface 106 is configured to transmit the encoded image frames over a network in the form of a bit stream 110 to a client device. The network interface 106 and the client device may apply a handshake procedure to confirm that the image frames are safely received by the client device. In more detail, upon receipt of an image frame, the client device may send an acknowledgement to the network interface. If no acknowledgement is received, the network interface 106 may deduce that the image frame was lost in the transmission. In response thereto, it may request that the next image frame be encoded as an intra-frame so as to enable the client device to re-start the decoding of the transmitted video.

The controller 108 is configured to control the video camera 100. In particular, the controller 108 is configured to control the video camera 100 upstream of the encoder 114. For example, the controller 108 may control the image sensor 102 to capture image frames and/or the image processor 112 to process image frames. More specifically, the controller 108 may control the settings applied by the image sensor 102 when capturing image frames, and/or the settings applied by the image processor 112 when processing image frames. In particular, the controller 108 may control settings which affect the level of noise in the image frames. Examples of such settings are exposure time, gain, sharpness, and parameters and complexity level of filters and processing algorithms.

The controller 108 may generally be implemented in software, in hardware, or a combination thereof. In the software case, the controller 108 may comprise a processor 116 and a memory 118 which may act as non-transitory computer-readable medium for storing computer-code instructions, which, when executed by the processor 116, causes the controller 108 to carry out any method described herein. In the hardware case, the controller may comprise circuitry, such as an integrated circuit, e.g., in the form of an application-specific integrated circuit or a field-programmable gate array. The controller 108 may also comprise a receiver, e.g., for receiving information regarding whether a next frame is going to be encoded as an inter-frame or an intra-frame, and a transmitter, e.g., for transmitting a control signal to the image sensor 102 and/or the image processor 112. The control signal may indicate the settings to be used when capturing and/or processing image frames.

Figure 2:
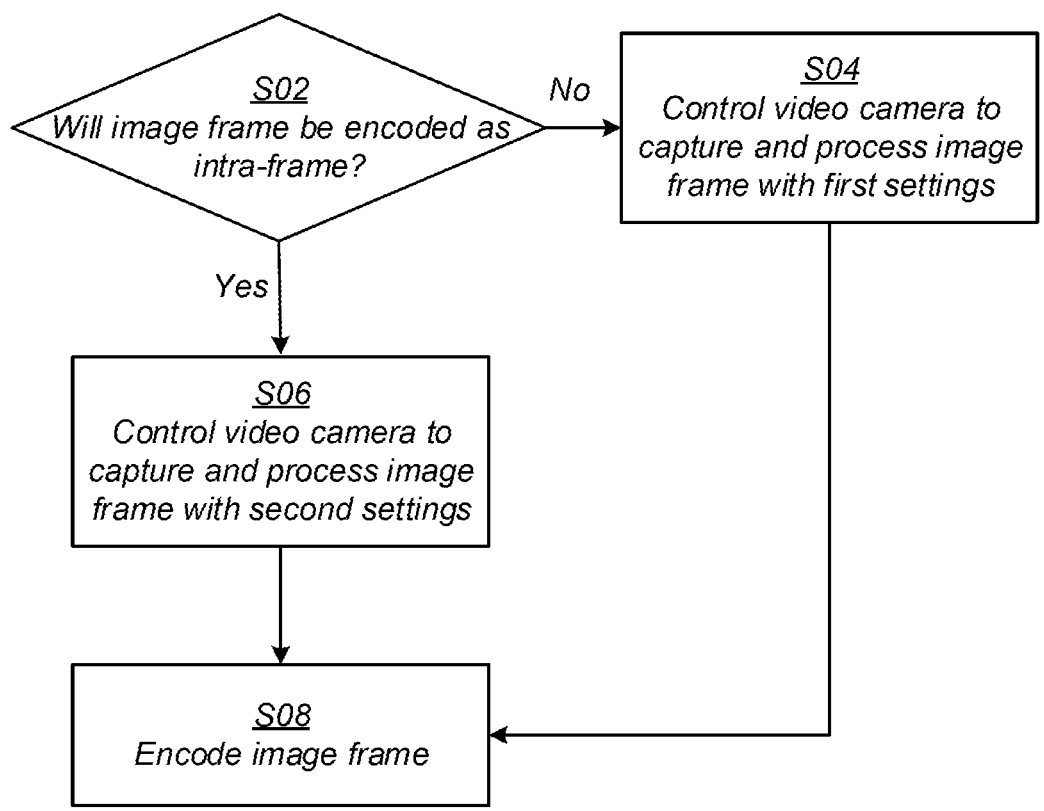
FIG. 2 is a flow chart of a method for controlling a video camera according to embodiments.

The operation of the video camera 100, and in particular the operation of the controller 108, will now be described in more detail with reference to FIG. 1 and the flow chart of FIG. 2.

In step S02, the controller 108 determines whether an image frame is going to be encoded as an intra-frame or an inter-frame. Typically, step S108 is carried out before the image frame is captured by the video camera 100. For example, the image frame may be the next frame to be captured.

The decision in step S02 may be based on information from the encoder 114. In particular, the controller 108 may receive information from the encoder 114 regarding a GOP structure. From the GOP structure, the controller 108 may determine whether the image frame is going to be encoded as an intra-frame (I-frame), or an inter-frame (P- or B-frame).

The decision in step S02 may be based on contents in previous image frames, that is, image frames that were captured and processed prior to the image frame with respect to which the decision is to be made. For example, the image processor 112 may have analyzed contents of the previous image frames. In particular, the image processor 112 may have analyzed the amount of motion in previous image frames, and on basis thereof determined whether the following frames should be encoded as intra-frames or inter-frames. If there is a lot of motion in the previous image frames, it may be beneficial to encode intra-frames more frequently compared to if there is less motion.

The decision in step S02 may also be based on information from the network interface 106. In more detail, if the network interface 106 receives an indication that an image frame was lost in the transmission, e.g., if the network interface 106 did not received any receipt acknowledgement for the concerned frame, it may request that a new intra-frame be encoded. Responsive to that request, the controller 108 may determine that the image frame is to be encoded an intra-frame.

The decision in step S02 may also be based on a fixed intra-frame rate. For example, every n:th image frame, such as every 10th image frame may be encoded as an intra-frame.

Typically, the decision regarding whether or not to encode an image frame as an intra-frame is taken a number of frames ahead of time, such as three frames ahead. In that way, the information regarding whether a particular image frame will be encoded as an intra-frame is available to the image sensor 102 and/or image processor 112 in time before capturing and processing the particular image frame.

If the controller 108 determines that the image frame is going to be encoded as an inter-frame, it proceeds to step S04. In step S04, the controller 108 controls the video camera 100 upstream of the encoder 114, and in particular, the image sensor 102 and the image processor 112, to capture and process the image frame using first settings. For this purpose, the controller 108 may send a control signal to the image sensor 102 and/or the image processor 112 which is indicative of the first settings. The first settings may for instance correspond to default settings, or settings which are automatically set by the video camera, e.g., by means of an auto-exposure procedure. Typically, when controlled using the first settings, the image sensor 102 and the image processor 112 will reduce the level of noise in the image frame to a first level, e.g., by applying a certain exposure time, gain, or noise filter.

If the controller 108 instead determines that the image frame is going to be encoded as an intra-frame, it proceeds to step S06. In step S06, the controller 108 controls the video camera 100 upstream of the encoder 114, and in particular, the image sensor 102 and the image processor 112, to capture and process the image frame using second settings. For this purpose, the controller 108 may send a control signal to the image sensor 102 and/or the image processor 112 which is indicative of the second settings. The second settings are different from the first settings. In particular, the second settings differ from the first settings in that they will cause the image sensor 102 and the image processor 112 to further reduce the level of noise in the image frame to a second level which is lower than the first level. Thus, the level of noise in the resulting image frame is lower when captured and processed using the second settings compared to if the image frame instead had been captured and processed using the first settings.

In order to generate the second settings, the controller 108 may modify the first settings, i.e., it may modify the default parameters or those parameters which were automatically set by the camera 100 by an auto-exposure algorithm.

According to embodiments, the controller 108 may modify the first settings so as to increase a ratio between exposure time and gain of the image frame. In more detail, the first settings may comprise values of exposure time and gain, e.g., as set by auto-exposure. The controller 108 may modify the ratio of exposure time to gain by, for instance, increasing the exposure time and reducing the gain. In this way, the level of noise in the image frame will be further reduced.

In some embodiments, the video camera 100 captures a plurality of images using different exposure times and gains, and then combines the plurality of images into a single image frame. This is sometimes referred to as wide dynamic range. In such embodiments, the controller 108 may modify the first settings including the different exposure times and gains of one or more of the plurality of images. For instance, it may increase the ratio between exposure time and gain of one or more of the images. However, it may not only increase the ratio between exposure time and gain for one or more of the plurality of images, but it may also modify the different exposure times in relation to each other.

According to embodiments, the controller 108 may modify the first settings so as to decrease the sharpness of the image frame. In this way, the image frame will be more smooth, and at the same time the bit rate will be reduced without any major effects on the visual quality after compression.

According to embodiments, the controller 108 may modify the first settings so as to increase a strength of at least one of a temporal noise filtering and a spatial noise filtering of the image frame. As further described above, the image processor 112 may be configured to apply different types of filters, such as a temporal noise filter and/or a spatial noise filter, to an image frame so as to reduce the level of noise in the image frame. The filters may be associated with parameters, or settings, which govern how much a pixel of the image frame is smoothed or averaged with respect to neighboring pixels in time and/or space. The parameters, or settings, also governs how many neighboring pixels in time and/or space that are used by the filter. The degree of smoothing is referred to herein as the strength of the filter. The stronger the filter, the higher the degree of smoothing. For example, consider a simple temporal filter where a value $P_t$ of a pixel at time t is smoothed by forming a weighted average with respect to a corresponding pixel value $P_{t-1}$ at time t-1 according to $\tilde{P}_t=(1-\alpha)P_t+\alpha P_{t-1}$, where $\alpha$ is in the range (0,1). A higher value of a gives more smoothing and hence a stronger filter.

According to embodiments, the controller 108 may modify the first settings by increasing a complexity level of at least one of a filtering and a processing algorithm applied to the image frame. For example, a more complex or advanced noise filtering algorithm may be used if the image frame is going to be encoded as an intra-frame compared to if it is going to be encoded as an inter-frame. The complexity level may be increased by choosing a different type of algorithm which is more advanced and more time consuming. Generally, an intra-frame is faster to encode than an inter-frame, since no search for motion vectors need to be made. That additional time may instead be spent on more complex filtering and processing.

When the video camera 100 has captured and processed the image frame as controlled by the controller 108, the encoder 114 will encode the image frame and transmit it in the bit stream 110 via the network interface 106. If it was decided in step S02 that the image frame is to be encoded as an intra-frame, the encoder 114 will encode the image frame as an intra-frame, and if it was decided that the image frame is to be encoded as an inter-frame, the encoder 114 will encode the image frame as an inter-frame. For this purpose, the encoder may use any known coding technique which uses inter-frame prediction, e.g., as standardized by H.264 or MPEG4.

It will be appreciated that a person skilled in the art can modify the above-described embodiments in many ways and still use the advantages of the present teachings as shown in the embodiments above. Thus, the present teachings should not be limited to the shown embodiments but should only be defined by the appended claims. Additionally, as the skilled person understands, the shown embodiments may be combined.

What is claimed is:

1. A method for controlling a video camera which is configured to capture and process a plurality of image frames prior to encoding, comprising:

determining, for each image frame from the plurality of image frames, whether the video camera is going to encode the image frame as an intra-frame or an inter-frame;

for image frames which are going to be encoded as inter-frames, controlling the video camera to capture and process the image frames to be encoded as inter-frames using first settings prior to encoding; and for image frames which are going to be encoded as intra-frames, controlling the video camera to capture and process the image frames to be encoded as intra-frames using second settings prior to encoding, wherein the second settings are modified in relation to the first settings to further reduce a level of noise in the plurality of image frames.

2. The method of claim 1, wherein the second settings are modified in relation to the first settings by increasing a ratio between exposure time and gain of the image frame.

3. The method of claim 2, wherein the plurality of image frames are composed of a plurality of images captured with different exposure times and/or having different gains, wherein the second settings are modified in relation to the first settings by increasing a ratio between exposure time and gain for at least one of the plurality of images.

4. The method of claim 3, wherein the second settings are modified in relation to the first settings by modifying the different exposure times and/or different gains in relation to each other.

5. The method of claim 1, wherein the second settings are modified in relation to the first settings to decrease sharpness of the plurality of image frames.

6. The method of claim 1, wherein the second settings are modified in relation to the first settings by increasing a strength of at least one of a temporal noise filtering and a spatial noise filtering of the plurality of image frames.

7. The method of claim 1, wherein the second settings are modified in relation to the first settings by increasing a complexity level of at least one of a filtering and a processing algorithm applied to the plurality of image frames.

8. The method of claim 1, wherein the determining whether the video camera is going to encode the plurality of image frames as intra-frames for inter-frames is based on information received from an encoder of the video camera.

9. The method of claim 8, wherein the information received from the encoder of the video camera comprises a group of pictures structure.

10. The method of claim 1, wherein the determining whether the video camera is going to encode the plurality of image frames as intra-frames or as inter-frames is based on contents in at least one of the previous image frames.

11. The method of claim 1, wherein the determining whether the video camera is going to encode the plurality of image frames as intra-frames or as inter-frames is made in response to a network interface of the video camera requesting that an image frame is encoded as an intra-frame.

12. A controller for controlling a video camera which is configured to capture and process a plurality of image frames prior to encoding, comprising:
a processor configured to:
determine, for each image frame from the plurality of image frames, whether the video camera is going to encode the image frame as an intra-frame or inter-frame;
control the video camera to capture and process the image frames using first settings prior to encoding for image frames which are going to be encoded as inter-frames; and
control the video camera to capture and process the image frames using second settings prior to encoding for image frames which are going to be encoded as intra-frames, wherein the second settings are modified in relation to the first settings to further reduce a level of noise in the image frame.

13. A video camera comprising:
an image sensor for capturing a plurality of image frames;
an image processor for processing captured image frames;
an encoder arranged downstream of the image sensor and the image processor for encoding captured and processed image frames; and
a controller for controlling the video camera, the controller comprising:
a processor configured to:
determine, for each image frame from the plurality of image frames, whether the video camera is going to encode the image frames as an intra-frame or inter-frame;
control the video camera to capture and process the image frames using first settings prior to encoding for image frames which are going to be encoded as inter-frames; and
control the video camera to capture and process the image frames using second settings prior to encoding for image frames which are going to be encoded as intra-frames, wherein the second settings are modified in relation to the first settings to further reduce a level of noise in the image frames;
wherein the controller is configured to control the image sensor to capture image frames and the image processor to process the captured image frames prior to encoding by the encoder.

14. A non-transitory computer-readable medium having instructions stored thereon for controlling a video camera which is configured to capture and process a plurality of image frames prior to encoding, execution of which by a computing device causes the computing device to perform operations comprising:
determining, for each image frame from the plurality of image frames, whether the video camera is going to encode the image frame as an intra-frame or an inter-frame;
for image frames which are going to be encoded as inter-frames, controlling the video camera to capture and process the image frames to be encoded as inter-frames using first settings prior to encoding; and
for image frames which are going to be encoded as intra-frames, controlling the video camera to capture and process the image frames to be encoded as intra-frames using second settings prior to encoding, wherein the second settings are modified in relation to the first settings to further reduce a level of noise in the plurality of image frames.

* * * * *